(12) United States Patent
Thomson

(10) Patent No.: US 9,637,210 B2
(45) Date of Patent: May 2, 2017

(54) ELECTRIC POWERED INFLATION SYSTEM

(71) Applicant: Air Cruisers Company, Wall Township, NJ (US)

(72) Inventor: Christian W. Thomson, Manasquan, NJ (US)

(73) Assignee: Air Cruisers Company, Wall Township, NJ (US)

( * ) Notice: Subject to any disclaimer, the term of this patent is extended or adjusted under 35 U.S.C. 154(b) by 0 days.

(21) Appl. No.: 14/885,132

(22) Filed: Oct. 16, 2015

(65) Prior Publication Data

US 2016/0107733 A1    Apr. 21, 2016

Related U.S. Application Data

(60) Provisional application No. 62/064,633, filed on Oct. 16, 2014, provisional application No. 62/141,532, filed on Apr. 1, 2015.

(51) Int. Cl.
*F04D 25/06* (2006.01)
*F04D 25/08* (2006.01)
(Continued)

(52) U.S. Cl.
CPC .............. *B63C 9/24* (2013.01); *A47C 27/082* (2013.01); *B63C 9/18* (2013.01); *B64D 25/14* (2013.01);
(Continued)

(58) Field of Classification Search
CPC ..... A47C 27/082; A47C 27/083; F04D 25/08; F04D 25/084; F04D 25/0673; B63C 9/18;
(Continued)

(56) References Cited

U.S. PATENT DOCUMENTS

| | | | |
|---|---|---|---|
| 3,339,690 A | | 9/1967 | Craig |
| 4,573,234 A | * | 3/1986 | Kochte ..................... A47L 5/24 15/323 |

(Continued)

FOREIGN PATENT DOCUMENTS

| | | |
|---|---|---|
| EP | 0039466 A1 | 11/1981 |
| WO | 2012035422 A1 | 3/2012 |

OTHER PUBLICATIONS

Rajakumar et al., *CFD Analysis of Flow Through Mixed Flow Compressor Under Various Operating Conditions*, International Journal of Scientific & Engineering Research, vol. 4, Issue 2, Feb. 2013, ISSN 2229-5518, pp. 1-8.

(Continued)

*Primary Examiner* — Peter J Bertheaud
(74) *Attorney, Agent, or Firm* — Kilpatrick Townsend & Stockton LLP; Dean W. Russell; Kristin M. Crall

(57) ABSTRACT

Embodiments of the present disclosure relate generally to inflation systems. Specific embodiments relate to inflation systems that use a mixed flow compressor to deliver a diagonal airflow for inflation. The inflation systems disclosed do not require the use of compressed gas, but can use a battery-powered or otherwise electric motor for generating airflow from ambient air. Particular embodiments may find use in connection with inflating evacuation slides or life rafts on board a passenger transportation vehicle, such as an aircraft or marine vessel. Other embodiments may be used for inflating shelters, life vests, or any other safety device that requires a rapid inflation.

28 Claims, 10 Drawing Sheets

(51) Int. Cl.
*A47C 27/08* (2006.01)
*B63C 9/18* (2006.01)
*B60C 29/00* (2006.01)
*B64D 25/14* (2006.01)
*F04D 17/06* (2006.01)
*F04D 17/10* (2006.01)
*F04D 27/00* (2006.01)
*F04D 29/28* (2006.01)
*F04D 29/42* (2006.01)

(52) U.S. Cl.
CPC .............. *F04D 17/06* (2013.01); *F04D 17/10* (2013.01); *F04D 25/06* (2013.01); *F04D 25/0673* (2013.01); *F04D 25/084* (2013.01); *F04D 27/008* (2013.01); *F04D 29/284* (2013.01); *F04D 29/4206* (2013.01)

(58) Field of Classification Search
CPC ......... B63C 2009/012; B63C 2009/048; Y10T 137/36
USPC ............................................. 417/411, 423.1
See application file for complete search history.

(56) References Cited

U.S. PATENT DOCUMENTS

| | | | | |
|---|---|---|---|---|
| 4,678,014 A | * | 7/1987 | Owen | F04D 25/084 141/350 |
| 5,052,894 A | * | 10/1991 | Rimington | A61G 5/1059 417/234 |
| 5,738,305 A | | 4/1998 | Pruitt | |
| 6,591,873 B1 | | 7/2003 | McNeil | |
| 6,598,626 B2 | * | 7/2003 | Chaffee | F04D 25/084 141/114 |
| 6,709,246 B2 | * | 3/2004 | Boyd | F04D 25/084 417/423.1 |
| 9,004,116 B2 | | 4/2015 | Walker et al. | |
| 2001/0026763 A1 | | 10/2001 | Chung | |
| 2011/0129369 A1 | * | 6/2011 | Potratz | F04D 25/084 417/410.1 |
| 2012/0060267 A1 | * | 3/2012 | Blenkarn | A45F 3/04 2/456 |
| 2014/0023491 A1 | | 1/2014 | Ruck | |

OTHER PUBLICATIONS

International Patent Application No. PCT/US2015/055917, Search Report and Written Opinion dated Apr. 7, 2016.

International Patent Application No. PCT/US2015/055917, Invitation to Pay Additional Fees and, Where Applicable, Protest Fee and Partial Search Report dated Jan. 21, 2016.

* cited by examiner

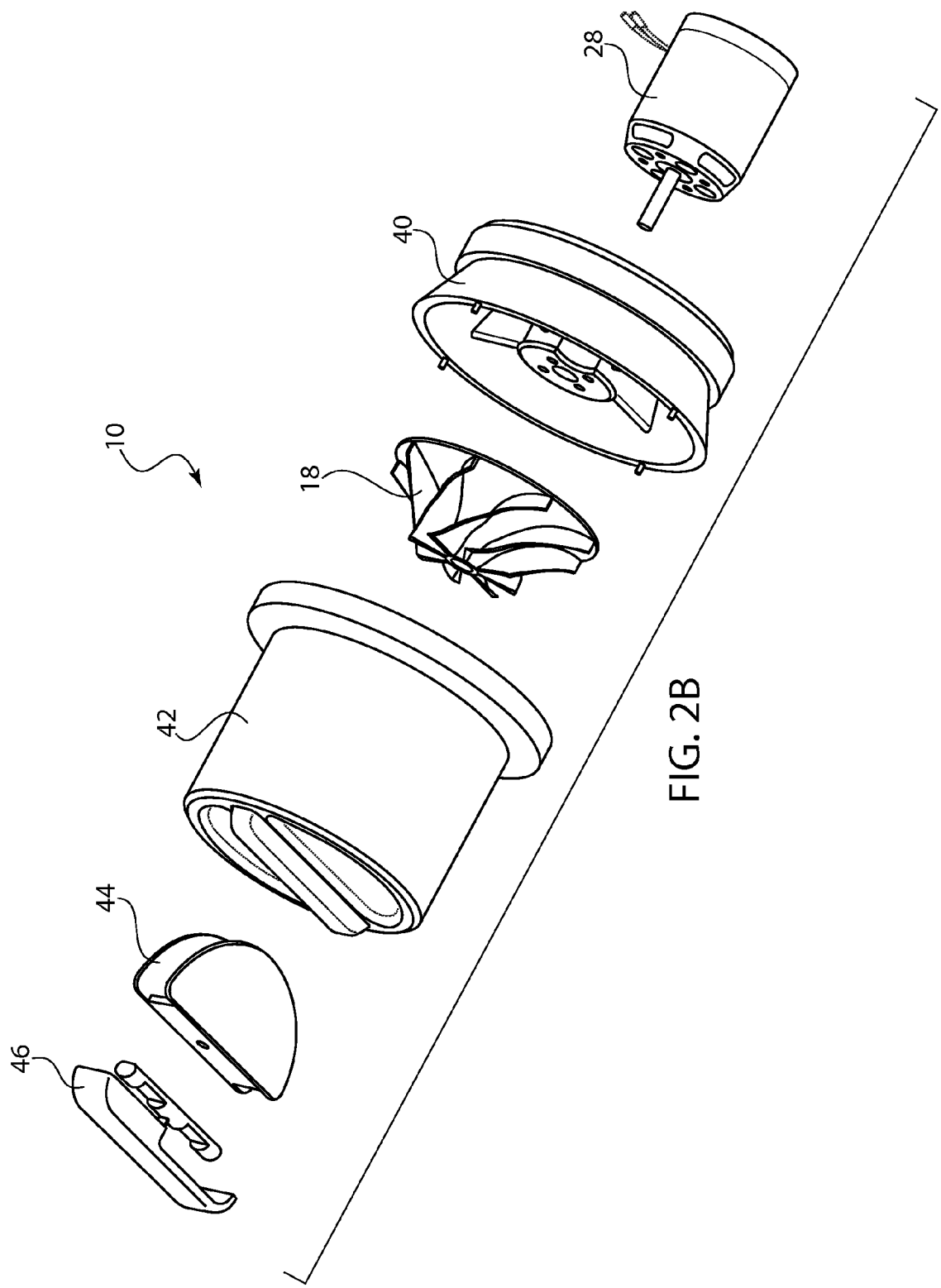

ELECTRIC POWERED INFLATION SYSTEM

CROSS REFERENCE TO RELATED APPLICATIONS

This application claims the benefit of U.S. Provisional Application Ser. No. 62/064,633, filed Oct. 16, 2014, titled "Electric Powered Inflation System," and U.S. Provisional Application Ser. No. 62/141,532, filed Apr. 1, 2015, titled "Mixed Flow Compressor," the entire contents of each of which are hereby incorporated by reference.

FIELD OF THE DISCLOSURE

Embodiments of the present disclosure relate generally to inflation systems. Specific embodiments relate to inflation systems that use a mixed flow compressor to deliver diagonal airflow for inflation. The inflation systems disclosed do not require the use of pressurized gas, but can use a battery-powered or otherwise electric motor for generating airflow from ambient air. Particular embodiments may find use in connection with inflating evacuation slides or life rafts on board a passenger transportation vehicle, such as an aircraft or marine vessel. Other embodiments may be used for inflating shelters, life vests, or any other safety device that requires a rapid inflation.

BACKGROUND

Inflation systems for safety systems, such as evacuation slides and life rafts that are required to be carried on-board aircraft, generally use compressed gas for inflation. For example, the evacuation slide and/or life raft may be coupled with a container of compressed gas used to inflate the structure. One or multiple chambers of the safety system may inflated upon (or before) deployment of the safety system.

As background, an evacuation slide is an inflatable slide used to allow passengers and crew to evacuate an aircraft in the event of an emergency. An evacuation slide is required on all passenger-carrying aircraft where the door sill height cannot allow evacuation of persons from the door uninjured. The Federal Aviation Administration (FAA) requires slides on all aircraft doors where the floor is 6 feet (1.8 m) or more above the ground. Such slides are generally provided with one or more inflatable chambers.

Evacuation slides are packed and held within the door structure inside the slide/door bustle, which is a protruding part inside an aircraft door. A slide bustle typically houses the evacuation slide, as well as the inflation system that will be used to inflate the slide. Many but not all slides are also designed to double as life rafts in case of a water landing and evacuation.

It is desirable for evacuation slides and/or life rafts to inflate quickly and reliably. The FAA requires evacuation of the entire aircraft in 90 seconds using 50% of the available evacuation exits. To meet this requirement, evacuation slides should deploy in less than 10 seconds. For large, wide body aircraft such as A300s and B747s, this means a successful deployment should be complete in about 5-7 seconds (depending upon whether conditions, such as temperature and winds). A high pressure of gas is thus required to make this deployment happen in the desired time period.

In use, if the aircraft doors are opened while the slide bustle is in an armed state, opening of the door pulls the slide pack out of the slide bustle. Once freed, the slide will fall (under gravity), pulling a pin from a valve of a container containing compressed gas and causing the slide to inflate. Currently, evacuation slides and life rafts use non-explosive, inert gas inflation systems. Similar systems are also used for life rafts.

The inflation system usually includes a pressurized cylinder, a regulating valve, high pressure hoses, and aspirators. The cylinder can be from about 100 to about 1600 cubic inches and filled to about 3000 psig with either gaseous nitrogen, or a mixture of gaseous $CO_2$ and nitrogen. In order to accommodate weight considerations, most cylinders are now made of aluminum or alloy cores wrapped with fiberglass, carbon fiber or other lightweight materials rather than steel, but weight reductions are still desirable. The regulating valve is used to mechanically meter out the gas at a desired rate.

However, inflation of the evacuation slides and life rafts using compressed gas can present various challenges. For example, compressed gas can be dangerous, difficult to transport, and prone to leaks. Compressed gas containers also carry an associated size and weight, which can be undesirable on board an aircraft where size and weight are at a premium. Use of compressed gas is also limited to a single use. Accordingly, improved inflation systems are desirable.

BRIEF SUMMARY

Embodiments of the present invention generally relate to inflatable safety systems and methods for their inflation. In one example, there is provided an electrically powered inflation system for inflating an inflatable structure on-board a passenger transportation vehicle, the inflation system comprising: a compressor wheel mounted with respect to a motor mount and a compressor housing, the compressor housing comprising an air intake inlet having an inlet axis, an electric motor configured to impart rotational speed to the compressor wheel, wherein the electric motor is battery-powered, wherein the compressor housing further comprises an exit in fluid communication with the inflatable structure, wherein in use, ambient air enters the intake inlet along the inlet axis and exits the compressor wheel at a diagonal angle with respect to the inlet axis.

In a further example, there is provided a method for inflating an inflatable structure, comprising: providing an electrically-powered mixed flow compressor; using the mixed flow compressor to convert ambient air into a high pressure air flow; and transmitting the high pressure air flow into the inflatable structure, causing the inflatable structure to inflate.

Another example provides a method for inflating a life raft or an evacuation slide, comprising: (a) providing a battery-powered inflator system comprising a compressor wheel mounted with respect to a motor mount and a compressor housing, an electric motor configured to impart rotational speed to the compressor wheel, wherein the electric motor is battery-powered, and an activation system activated by a triggering event; (b) the activation system causing inflation upon the triggering event by delivering battery power to the motor, causing the compressor wheel to rotate, and delivering air generated by the compressor wheel to the life raft or evacuation slide.

A further example provides an inflation system, comprising: a compressor wheel housing having an air intake inlet and an air outlet, a compressor wheel mounted in the compressor wheel housing, a DC brushless motor configured to rotate the compressor at high RPM, a DC battery for providing power to the DC brushless motor, a switching device to apply power from the battery to the motor upon detection of a triggering event, and a charging device to maintain the readiness of the battery.

BRIEF DESCRIPTION OF THE DRAWINGS

FIG. 2B shows an exploded view of the mixed flow compressor of FIG. 1.

DETAILED DESCRIPTION

Embodiments of the present invention generally relate to inflatable safety systems and methods for their inflation. Other embodiments provide methods for inflating an inflatable chamber. One aspect provides an inflation system capable of providing faster and more efficient inflation of inflatable articles, without the need for using a pressurized gas container.

Although the embodiments are described for particular use in connection with inflation of evacuation slides and life rafts, it is understood that the systems described herein may be used with any inflation system. Non-limiting examples of potential inflatable structures include but are not limited to evacuation slides, evacuation slide/rafts, life rafts, emergency floats, emergency flotation systems, life preservers or life vests, shelters (such as decontamination shelters or military shelters), aviation life rafts, marine life rafts, ship decoys, inflatable military targets, space applications, home-based applications (such as inflatable air mattresses and inflatable bounce houses), and others. For example, it is envisioned that one or more of the embodiments described herein may find use in connection with inflatable and deflatable safety systems. It is further envisioned that one or more of the embodiments described herein may find use in connection with military applications, such as inflatable and deflatable Navy seal life rafts. Any instance in which a high pressure inflation for one or more inflation chambers should be achieved in a short period of time may make use of the systems described herein.

In some embodiments, the inflation system 10 can reach a target inflatable pressure of about 1.5-2.0 psig and 30 seconds or less. The inflation systems are also designed to operate under extreme (cold and hot) temperatures, as well as in water-based environments (in rain or when the inflatable structure is deployed or submerged in a body of water for an identified amount of time).

Figure 4A:
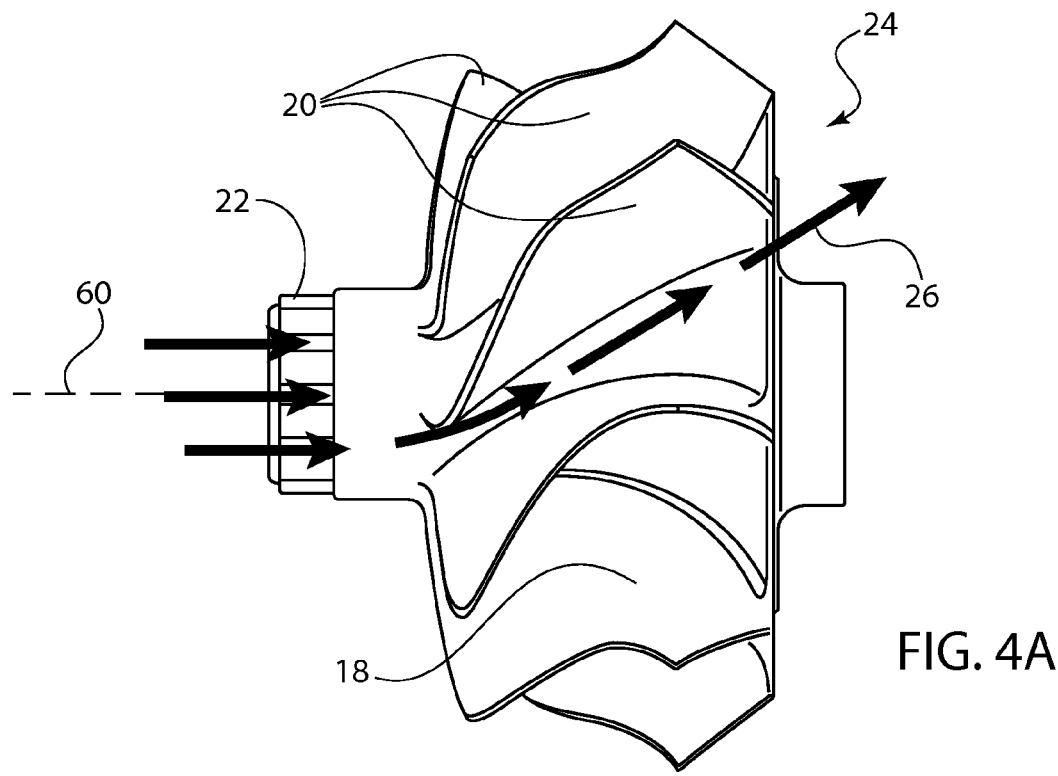
FIG. 4A shows a side plan view of a compressor wheel encouraging a diagonal airflow across and between its blades.
Figure 4B:
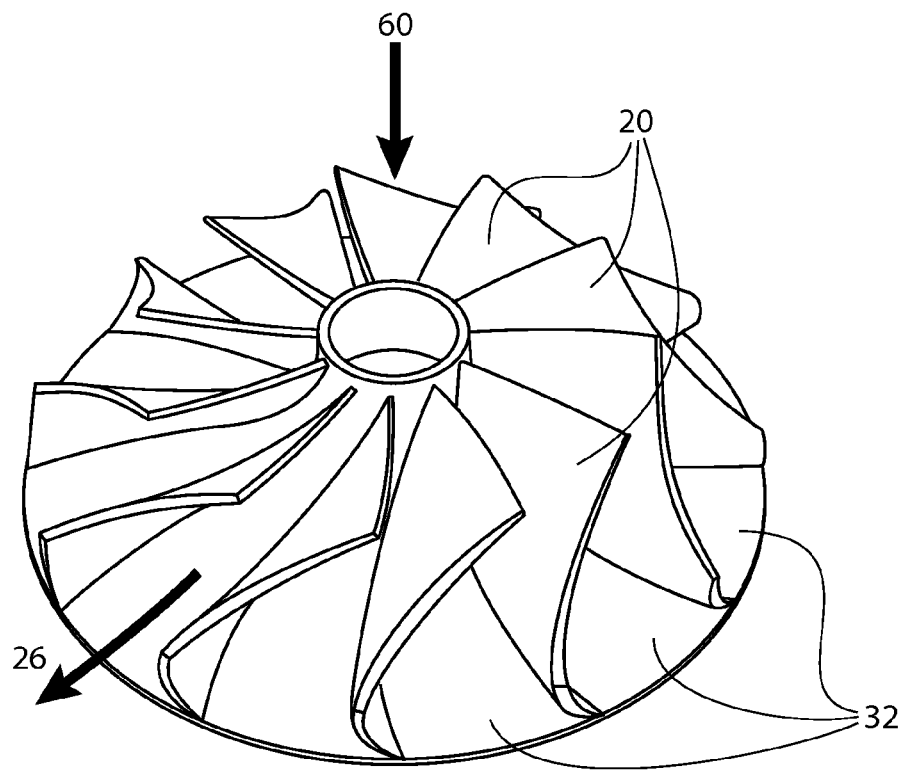
FIG. 4B shows a top perspective view of a compressor wheel.
Figure 5:
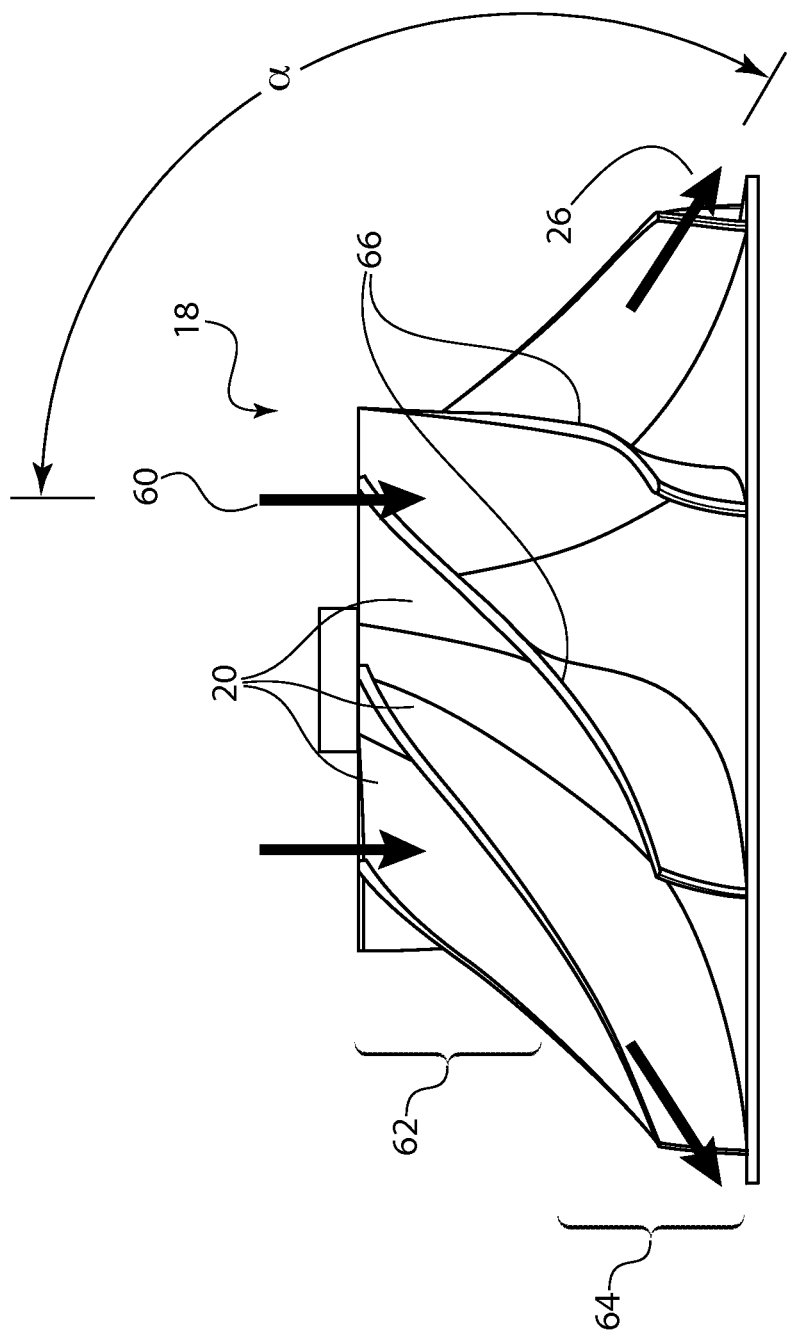
FIG. 5 shows a side plan view of a compressor wheel, illustrating inlet and outlet regions.

Certain embodiments relate to an inflation system 10 that uses an air compressor that relies on electric power. The electric power may be provided by an associated battery that powers the electric motor air compressor system. In one example, the air compressor is provided as a mixed flow compressor 12. The mixed flow compressor 12 provides a high flow rate with a high pressure for delivering air. As described in more detail below and as illustrated by FIGS. 3-5, the mixed flow compressor 12 is generally designed to allow air to enter the air intake inlet 22 in a generally axial direction, but to move through the compressor body and across the compressor wheel 18 at a diagonal direction to its axial entrance. The air exiting the compressor wheel 18 exits diagonally with respect to its intake direction.

Exemplary flow rates may include from about 10 to about 2400 cubic feet per minute (CFM). For example, the inflation systems described may inflate a life raft at about 15 CFM to about 320 CFM. The inflation systems described may inflate inflatable shelters at about 15 CFM to about 320 CFM. The inflation systems described may inflate an evacuation slide at about 340 CFM to about 2250 CFM. (The flow rate for evacuation slides is generally desirably higher than that of rafts or shelters because evacuation slides must inflate in a shorter amount of time than that required for rafts and shelters.) These ranges are provided for exemplary purposes only, in order to illustrate some initial flow rates that have been achievable.

Exemplary inflation pressures include from about 1 to about 120 pounds per square inch gage (psig). For example, the inflation systems described may inflate a life raft at about 1.0-3.5 psig or from about 1.0-4.0 psig. The inflation systems described may inflate an evacuation slide at about 1.0-3.5 psig or from about 1.0-4.0 psig. The inflation systems described may inflate an inflatable shelter at about 30-120 psig. (The pressure for inflatable shelters is generally higher because the tubes that make the shelters are generally of small diameter.)

Figure 1:
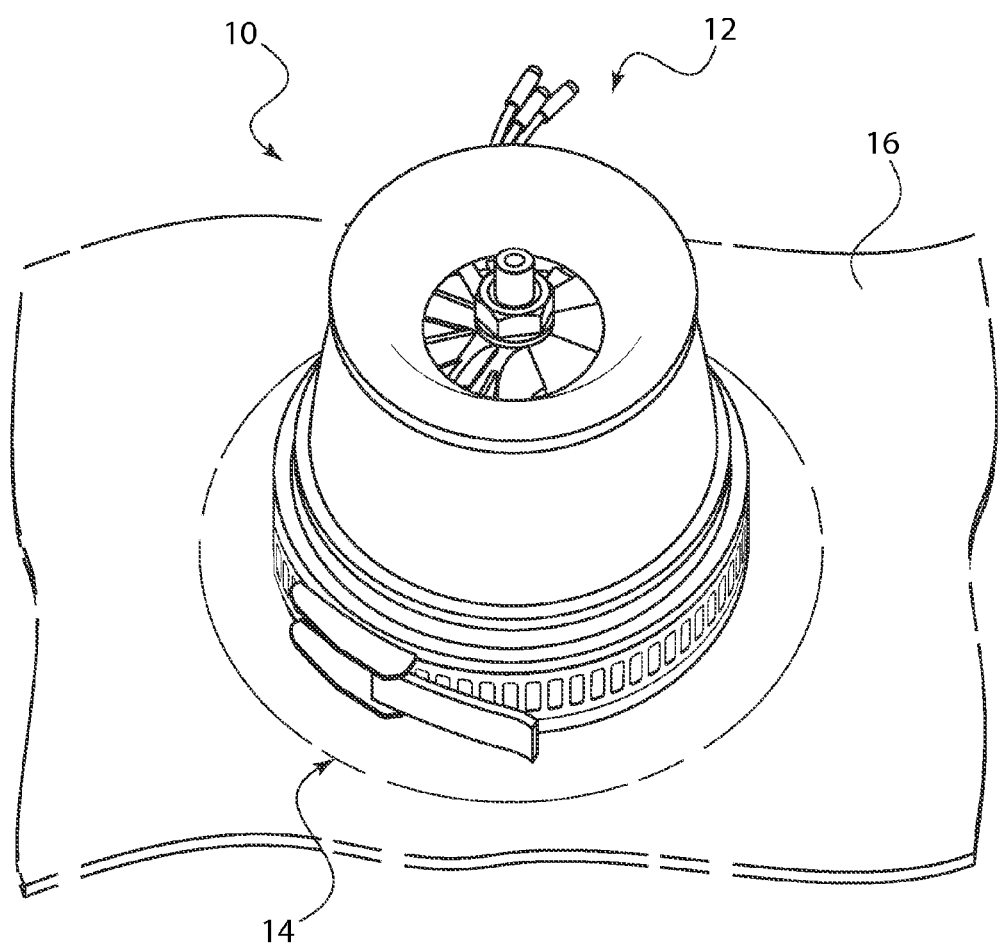
FIG. 1 shows a perspective view of a mixed flow compressor mounted with respect to an inflatable structure.

As shown by FIG. 1, the mixed flow compressor 12 may be associated with an opening 14 or inlet of an inflatable structure 16. The inflatable structure 16 may be any of the above described options, or any other structure benefiting from a rapid inflation rate at a high pressure. It is possible for the mixed flow compressor 12 to be mounted directly in the opening 14 of the inflatable structure 16, as illustrated by FIG. 1. It is also possible for the mixed flow compressor 12 to be indirectly coupled to the opening 14 via one or more tubes or hoses. The mixed flow compressor 12 is configured to inflate the inflatable structure 16 by delivering air at a high/rapid flow rate and at a high pressure.

Figure 2A:
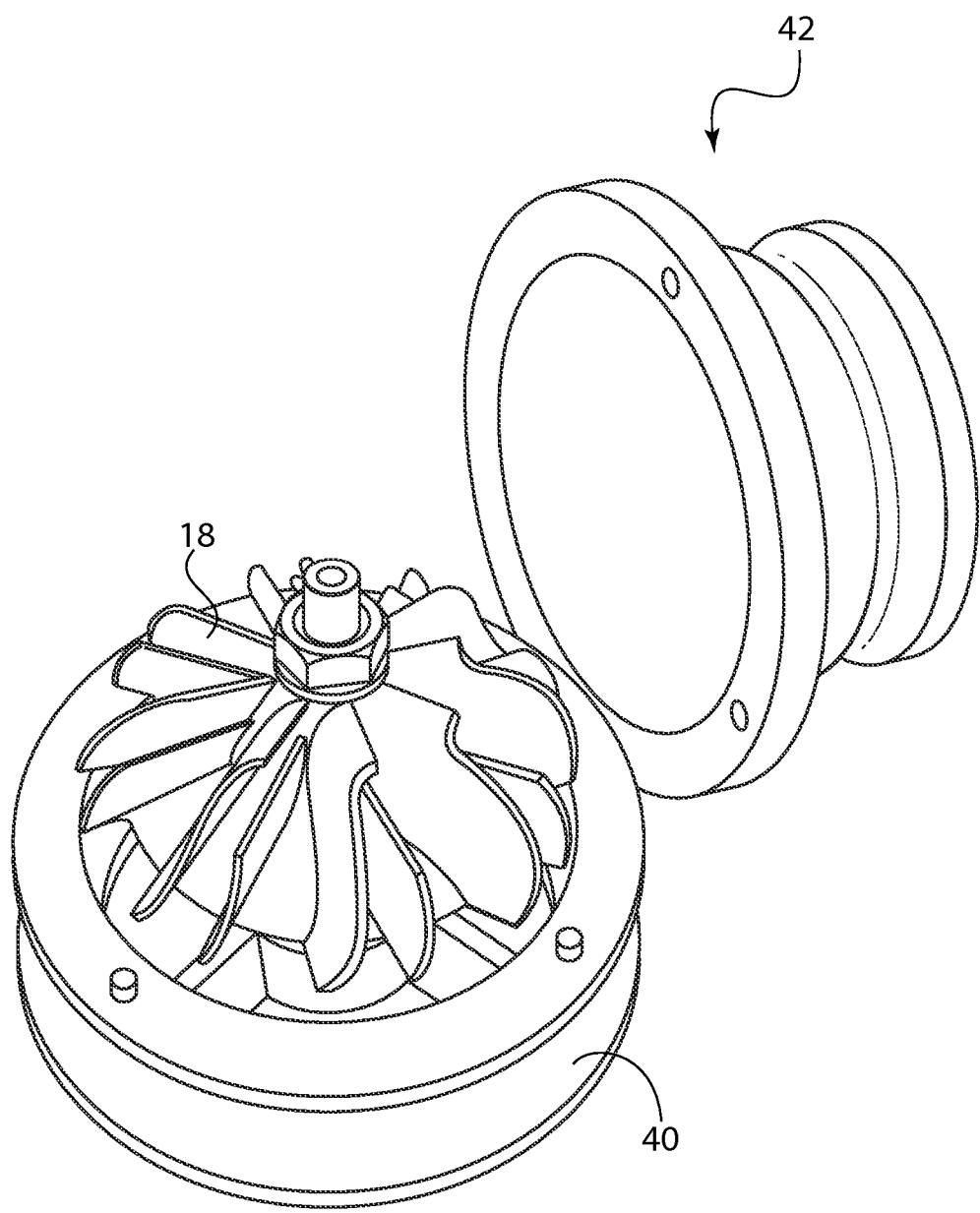
FIG. 2A shows a perspective view of the mixed flow compressor of FIG. 1 with the compressor housing removed.

As illustrated by FIGS. 2A and 2B, the mixed flow compressor 12 generally includes a motor mount 40, a compressor housing 42, a compressor wheel 18, a flapper valve 44 and a flapper handle 46. The motor mount 40 may house and support an electric motor 28. The mixed flow compressor 12 may be coupled or otherwise associated with an activation system 48 that triggers inflation upon detection of a triggering event. In some embodiments, the motor mount may be mounted in the opening 14 of the inflatable structure 16. The compressor housing 42 may help prevent debris from entering the compressor 12 as well as provide a safety barrier for the working components of the compressor 12. The compressor wheel 18 may be oriented in order to generate a vacuum force that forces ambient air into the inflatable structure 16. Once the unit is inflated to the desired amount, the valve may be caused to close in order to prevent unintended leakage. The flapper valve 44 and the flapper handle 46 may cooperate in order to lock the flapper valve in the closed position after inflation. This may particularly useful if the inflatable structure is to be used for many hours at a time, such as a life raft, or in an inhospitable environment, such as in crashing ocean waves. FIG. 2A illustrates a perspective view of the compressor with the housing removed. FIG. 2B illustrates an exploded view of a compressor system.

FIG. 3 illustrates a cross-sectional view through the compressor housing 42. The air inlet 22 generally provides an air intake area for receiving ambient air. The exit 24 provides an air exit area for expelling air into the inflatable structure at a high rate/high pressure.

The use of a mixed flow compressor has been found to deliver a desired rate and pressure required for inflation of a life raft or evacuation slide in the required time parameters at the necessary pressure levels. It is believed that this is achieved by the nature of the compressor and its ability to combine both axial and radial components to produce a diagonal airflow. As background, in an axial compressor, fluid flows parallel to the rotation axis. In a radial compressor (such as a centrifugal compressor), fluid flows perpendicular to the rotation axis. A mixed flow compressor, by contrast, is a cross between an axial and radial compressor, in which the flow takes a diagonal airflow route 26 through the compressor, exiting diagonally (rather than axially or radially). The exit 24 may have a higher mean radius than at the inlet 22. The compression process is thus part axial and part centrifugal. A mixed flow compressor provides a relatively high pressure ratio per stage, without the need for a relatively large diameter exit diffuser.

Axial compressors can inflate quickly, but they do not provide good pressure for the inflated structure and are generally limited to less than 1 psig. On the other hand, radial fans/compressors generally are capable of high pressures at lower RPMs, but inflate slowly. To get pressures as high as 2-3 psig, radial compressors sacrifice air flow (which is one reason it takes a few minutes to fill up a relatively small volume). In order to achieve higher pressures, a radial compressor would need to have a very large outer diameter and a bulky housing. Additionally, battery-operated inflation models (such as those used to fill a camping air mattress) typically use a brushed DC motor, which spins at a much lower RPM and has a lower power output than a brushless DC motor.

The common belief in the aircraft inflatable structure art at the time that the inventors began working on the current inflation system was that it was not possible to create enough inflation fluid/air to inflate a large structure without the use of pressurized gas. It was also believed that the use of a compressor would not be acceptable due to the various atmospheric and environmental conditions in which the system would have to function. It was also believed that the use of a battery-powered motor would not be possible due to weight, power, and space limitations/requirements.

The current inventors nonetheless experimented with different energy density batteries, different motors, and various blade shapes/configurations in order to develop the inflation systems described. The high RPM and higher torque used for the inflation systems of the present disclosure allow the mixed flow compressor 12 to move a high volume of air at an initial low pressure (ambient), but to convert the air to a high pressure output. As the inflatable structure fills, the compressor can pressurize the air at a lower flow rate. As shown by FIG. 4, the compressor wheel 18 is generally a circular disk with curved vanes or blades 20. The compressor wheel 18 is the rotating component of the system that accelerates the fluid/air inside the compressor 12. In use, the compressor wheel 18 is driven at a high speed by an electric motor 28. A drive shaft 52 may couple the motor 28 and compressor wheel 18. The motor 28 converts electrical energy into mechanical rotation. The velocity gained by the air is transformed into pressure. As the compressor wheel 18 rotates, it moves ambient air from the suction opening/air inlet 22 in its center to the outer edge of the blades 20. The air can enter the suction opening at a relatively low velocity, but leaves the outer edge of the compressor wheel 18 at a high velocity. The compressor wheel 18 transfers its rotational energy to the air.

The blades 20 of the compressor wheel are generally shaped so that air entering the suction opening 24 is transferred across the blades in a diagonal manner 26. FIGS. 4A and 4B illustrate one example of a compressor wheel 18 having compressor blades 20 that can produce a diagonal airflow 26. A side plan view of the compressor wheel 18 is illustrated by FIG. 5. As shown by these figures (particularly FIGS. 3A and 3B), the air exit 24 is generally greater in size than the air inlet 22. The air flow enters the inlet 22 along an inlet axis 60. This axis 60 is generally axial with the inlet 22 and the drive shaft 52 with which the compressor wheel 18 cooperates. As air moves across the blades 20, it is turned diagonally.

For example, FIG. 5 illustrates a compressor wheel 18 having two regions, an inlet region 62 and an outlet region 64. The inlet region 62 has blades 20 with features of axial blades, and the outlet region has blades 20 with features of radial blades. The combination of these features in a single blade is what can deliver the improved speed and pressure for the inflation system described. The inlet region 62 of the blades allows the air to enter the compressor in an axial direction. An exemplary air entering range may be from about 0 degrees to about 15 degrees. At the inlet region 62, the blades are shaped similarly to blades of an axial fan.

Along their length, however, the blades 20 are caused to form a twisted portion 66. This twisted portion 66 causes the blades at the outlet region 64 to move the air in a diagonal nature through the wheel 18.

As illustrated by FIG. 5, an exemplary exiting range for air exiting the blades 20 is illustrated by $\alpha$. The angles below are described with the perspective that air flowing straight through the system (without being turned and staying aligned with the inlet axis 60) is assumed to be 180 degrees. In one example, the air exiting the blades may be from about 95 degrees to about 175 degrees. In another example, the air exiting the blades may be from about 100 degrees to about 160 degrees. In another example, the air exiting the blades may be from about 95 degrees to about 120 degrees. In another example, the air exiting the blades may be from about 120 degrees to about 145 degrees. In another example, the air exiting the blades may be from about 145 degrees to about 170 degrees.

The shape of the compressor wheel vanes/blades 20 can modify the performance of the mixed flow compressor 12. Varying the angle of the blades 20 can give varying flow characteristics. The lower the angle $\alpha$ of the exiting air, the higher the pressure that can be achieved (but which can lower the flow rate). The disclosed compressor wheel shape can allow use of a more compact design than if a centrifugal compressor is used. (Centrifugal compressors typically have a large perimeter housing to collect the pressurized gas and require extra duct work to deliver the compressed gas to the desired location.)

The channel space 32 between compressor wheel blades 20 may also be modified in order to achieve the desired performance. It should be understood that optimization of blade shape and channel shape is possible, and that the figures accompanying this disclosure provide exemplary embodiments only. The compressor geometry may be altered to optimize flow rate, pressure potential, or combinations thereof.

Figure 3A:
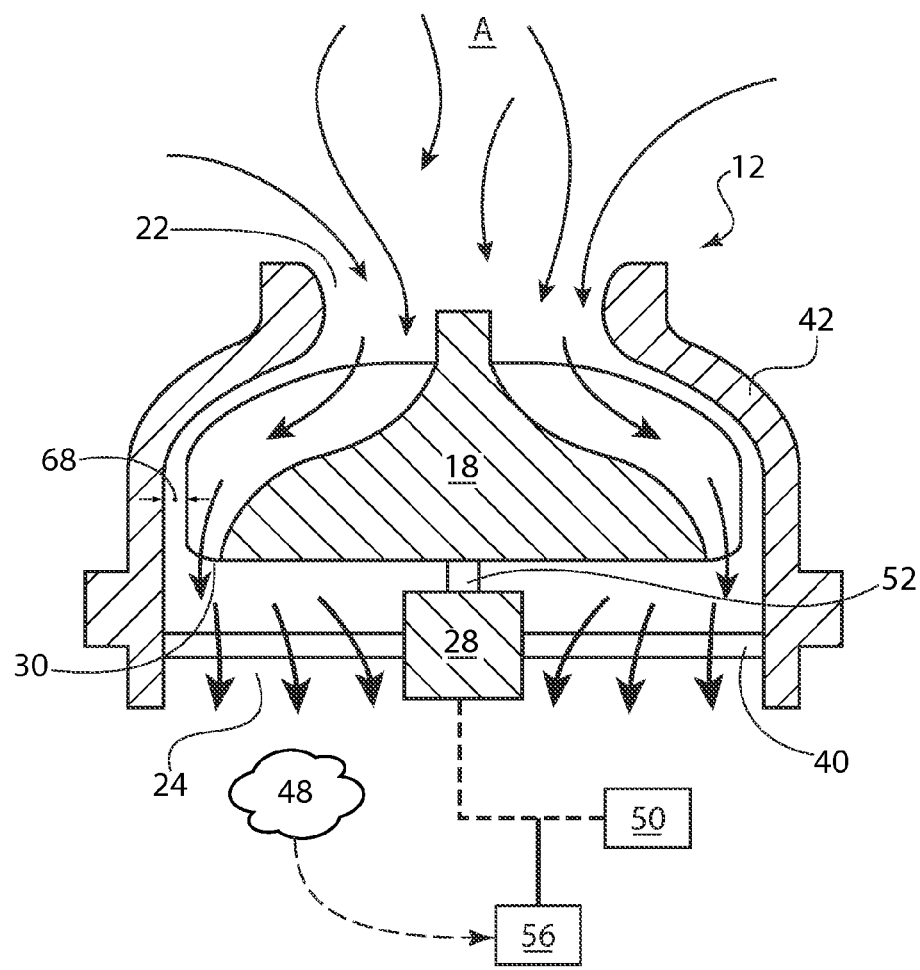
FIG. 3A shows a cross-sectional view through a compressor housing, illustrating the flow of ambient air "A."
Figure 3B:
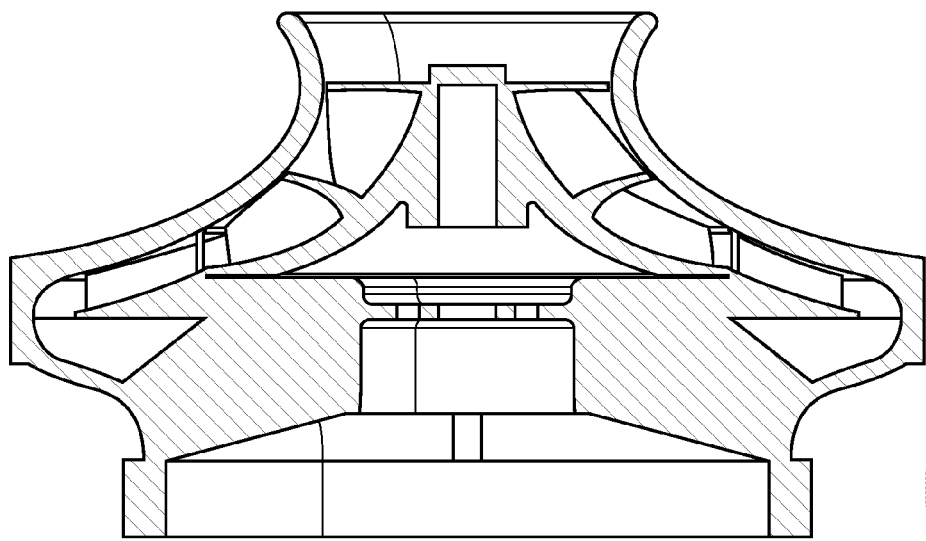
FIG. 3B is a cross-sectional view through a compressor housing having an alternate shape.

As illustrated by FIG. 3A, even after the air exits the blades at a diagonal angle, it is possible for the housing to turn the air again so that it exits the housing at any desired angle. Air could exit in-line with the inlet axis 60 or it may be turned to exit any other appropriate direction.

Additionally, it can be desirable for the space 68 between the compressor housing 42 and the compressor wheel 18 to be as small as possible. (The space 68 illustrated by FIG. 3A is greatly exaggerated and not to scale.) The space 68 should be sufficient to allow clearance of the compressor wheel 18 but is preferably a size that that can allow an increase of pressure of the air with minimal return leakage/bleed air. In one example, the space 68 is about 0.0001 inch.

Figure 6C:
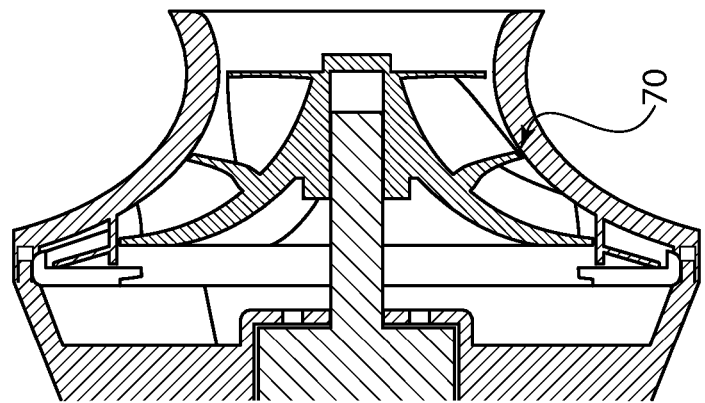
FIGS. 6A-6C show cross-sectional views of a sliding compressor wheel in a compressor housing.
Figure 6B:
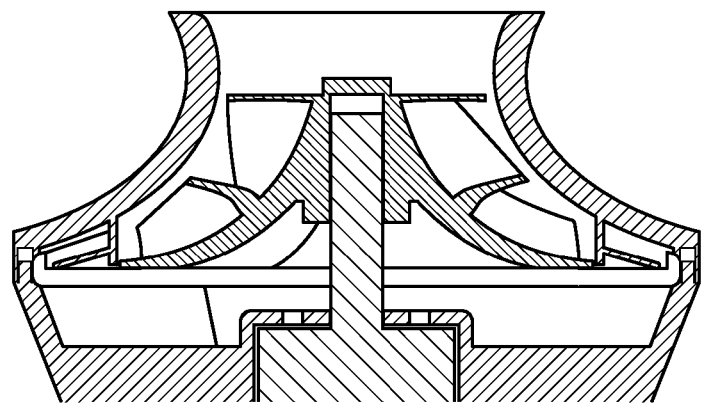
Figure 6A:
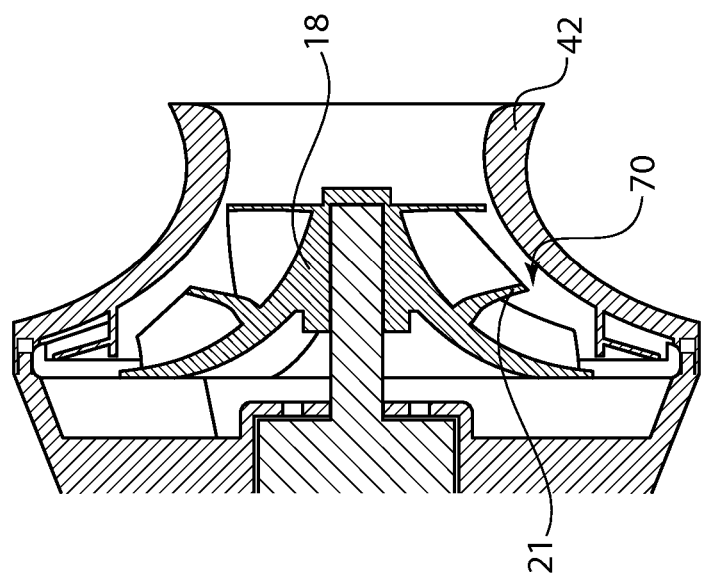

However, as illustrated by FIGS. 6A-6C, it is possible to provide a compressor wheel 18 that is allowed to shift within the housing 42. For example, as is shown in FIG. 6A, the outer blade edge 21 of the wheel 18 and the inner wall of the housing 42 define an air gap 70. Air gap 70 is sized to allow a relatively high air flow. This can be useful as the system is just beginning to inflate in order to build air flow at a high flow rate. As the system continues to run and as back pressure builds, the compressor wheel 18 can be allowed to move in order to close the air gap 70. In one example, the compressor wheel 18 may move with respect to the drive shaft 52. As illustrated by FIG. 6B, this movement can cause the air gap 70 to become smaller and to make the clearance between the blade edge 21 in the housing 42 tighter. As illustrated by FIG. 6C, the air gap 70 can be made minimal, delivering maximum pressure.

In one example, the movement of the compressor wheel 18 may be with respect to the drive shaft 52. This movement may be accomplished by magnets. This movement may be accomplished by a sliding shaft. This movement may be accomplished by one or more end stops. This movement may be accomplished by a biased spring. For example, the biased spring may hold the compressor wheel in the larger air gap 70 position (e.g., FIG. 6A) and as the inflation structure inflates and as the compressor wheel 18 slides, the wheel 18 may compress the spring in order to close the air gap 70 (e.g., FIGS. 6B and 6C).

In another example, the movement of the compressor wheel or rotating assembly could be actuated using the air pressure of the inflatable unit to act upon the bottom of the compressor wheel to force it upward until it reaches a positive stop.

In another example, an air driven cylinder could be used to apply an upward force on the motor shaft, compressor wheel, or entire rotating assembly to move it closer to the compressor housing. The throw of the cylinder can be limited to prevent the blades from hitting the compressor housing.

In another example, an electromagnet actuator could be employed to generate a magnetic force to draw the compressor wheel, motor shaft, or rotating assembly toward the upper compressor housing at a pre-determined pressure. Conversely, the electromagnet could be used to counter-act a spring force acting in the opposite direction during the initial portion of the inflation and leave the wheel in the extended position as the default position.

In another example, it is possible for the drive shaft to move within the motor housing. In a further example, the motor and compressor wheel could move with respect to the housing. Any of these options are considered within the scope of causing the compressor wheel to move or shift with respect to the housing.

Figure 7:
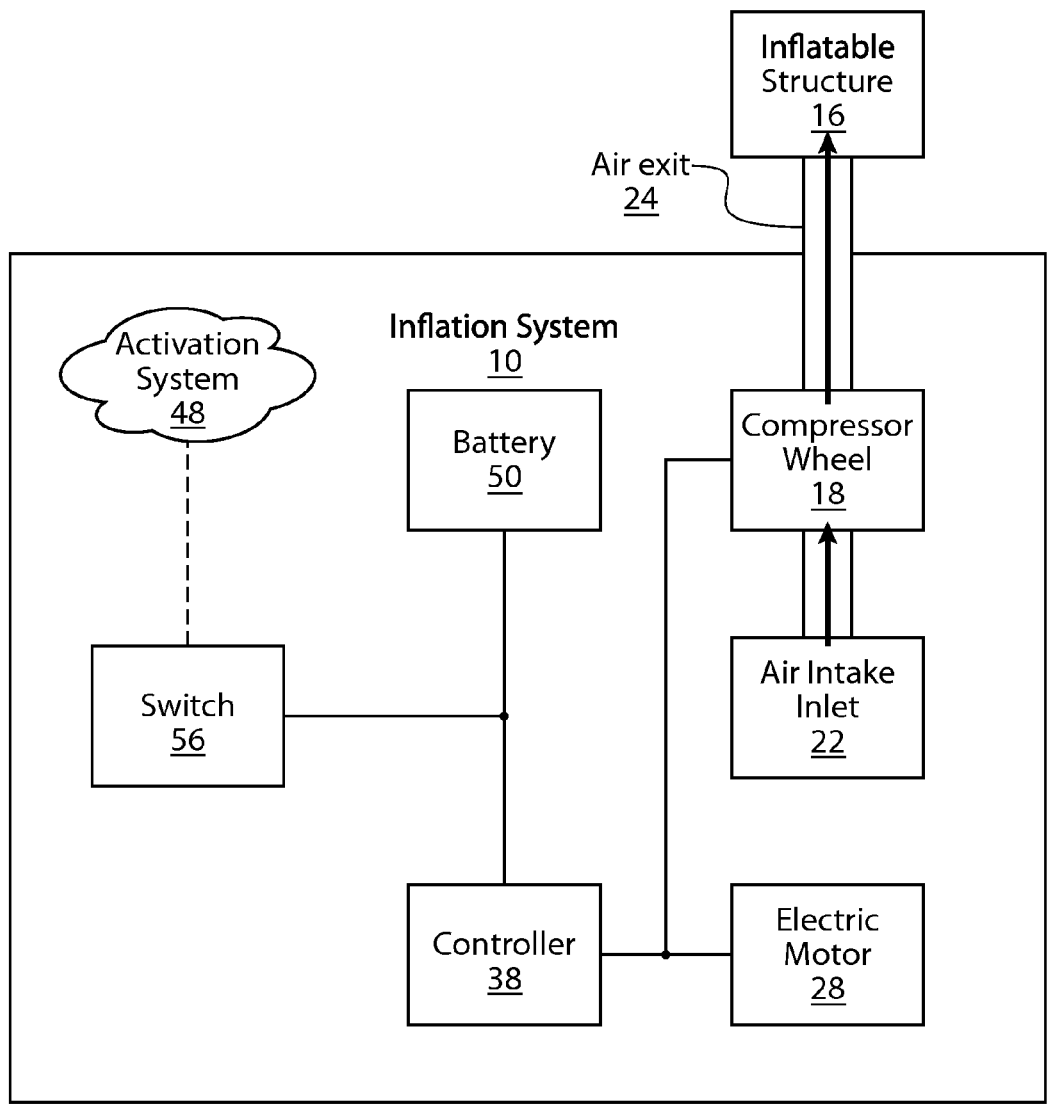
FIG. 7 shows a schematic illustrating cooperation between the inflation system components.

FIG. 7 provides a schematic of the inflation system 10. As shown, once the activation system 48 is a triggered, the inflation system 10 will be activated. An electrical switch component 56 can activate delivery of power from the battery 50 to the controller 38 which activates electric motor 28. In one example, the electric motor 28 may be a brushless DC motor. A brushless DC motor may be particularly useful in damp conditions or in conditions where the inflation system 10 may come into contact with water. Such a motor is powered by electrical currents/electromagnetic induction such that it is inherently water resistant. Brushless motors also deliver higher performance based on their size than brushed motors.

One specific electric motor that has been tested and that is considered within the scope if this disclosure is a QF2822 brushless motor manufactured by QX-Motor in China. Such a motor has a maximum continuous power of about 500 W, a maximum continuous current of about 34 A, a voltage of about 14.8 V, and provides a motor constant (RPM/Volt) of about 3000 KV.

Possible electric motors include in-runner brushless motors. The motors may have sealed bearings and housings in order to improve functioning in a water situation. It is also possible for an inflation system to use more than one motor. For example, one example may use two electric motors, each with a minimum power of 800 W (assuming two compressors are used.)

The controller 38 may be an Electronic Speed Control (ESC). The ESC can convert the battery power to three phase electric for use by the brushless motor. The controller may process inputs from the activation system 48 upon a triggering event, such as receiving input from a pull cord, a pressure sensor, a water sensor, or a manual activation switch to determine when to run the electric motor 28.

In one example, the electric motor 28 may be powered by A/C, D/C, batteries, or any other means of stored electrical energy. In specific embodiments, the electric motor 28 may be a battery-powered motor. If provided as battery-powered, the electric motor 28 is generally associated with one or more batteries 50, depending upon the size of the inflatable structure 16. The batteries may be re-chargeable batteries. The battery charge may be maintained by a use of a charger from an external power source, from the aircraft's generator, or any combination thereof. The general intent is to maintain the battery at its full capacity for deployment. The battery 50 used in the system can generally support the required voltage and supply a high discharge rate (e.g., about 50-60 amps).

Previous battery technologies used for smaller inflatables were not acceptable for inflating passenger life rafts or evacuation slides, which must inflate within certain time limits for their use as safety devices. Additionally, battery size and weight are primary considerations for use on board aircraft. In order to have enough power to run an inflation system for long enough to inflate an entire unit, the battery would have had to be very large and heavy. However, with the newer battery technology, the amount of energy stored in the same weight and space is increased, often by 10 fold. Additionally, newer batteries have a higher rate of discharge.

One example of a potential battery 50 that may be used in the disclosed inflation system 10 is a lithium metal oxide battery. Another example may be a lithium ion battery. One specific example is 18650 lithium cell battery, such as the Molicel lithium ion rechargeable battery. It is generally desirable that the battery have a high energy density. In one example, the batteries may be combined into a battery pack. Such a battery pack can generally weigh less than about 0.5 pounds and can power the inflation system through multiple deployments. Lithium cell batteries can also deliver over 30 A of current power per cell and when wired together, could supply over 1000 W of power. These batteries may also be rechargeable. It is possible for the battery system to be designed such that maintenance personnel can replace the battery without disturbing the packed life raft or evacuation slide.

In another example, the electric motor may be powered by a fuel cell. In another example, the electric motor may be powered by a generator, such as a gas generator. Any portable electricity source is possible and considered within the scope of this disclosure. Whatever power source is used, the electrical system may be provided with a charge status indicator, which displays the readiness of the system for testing purposes.

Testing can be simplified to simply pressing a test button and plugging in a new battery if needed. For example, the battery could have a charging level indicator. The indicator could be an intermittent light that indicates that the battery is charged and ready for use. It is possible to test an electric or battery-powered system multiple times prior to its use, unlike a compressed gas inflation system. The battery maintenance interval could be extended well beyond that of a gas cylinder. It is also possible to provide for multiple uses on a single charge.

Figure 8A:
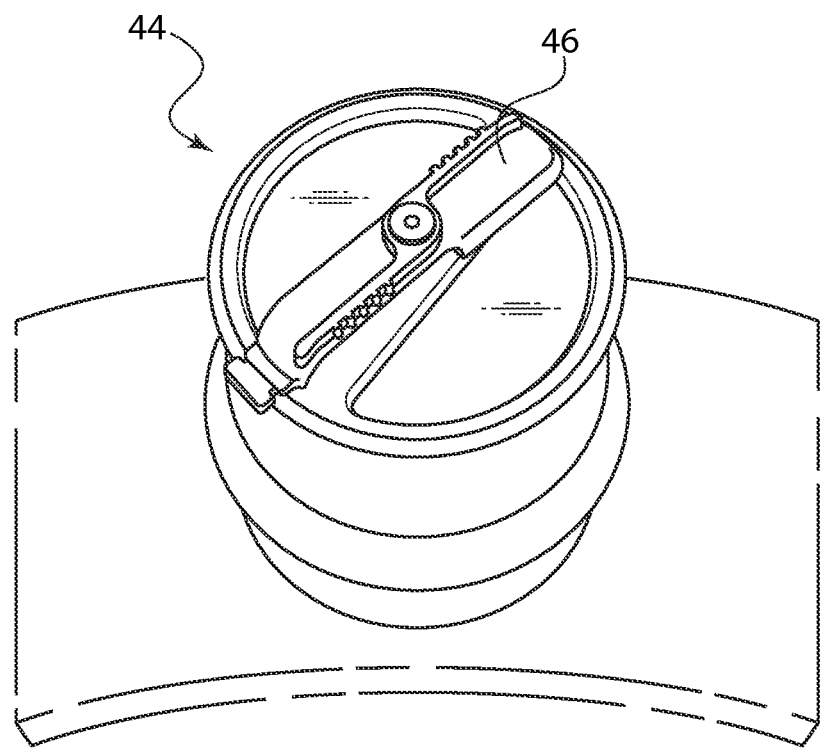
FIG. 8A shows a top perspective view of a flapper valve in a closed position.
Figure 8B:
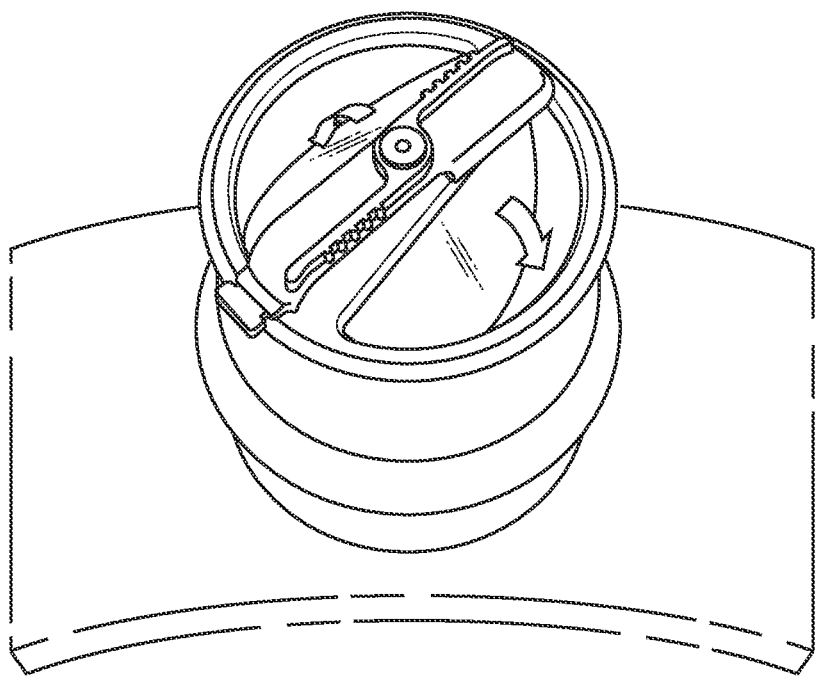
FIG. 8B shows a top perspective view of a flapper valve in an open position.
Figure 9:
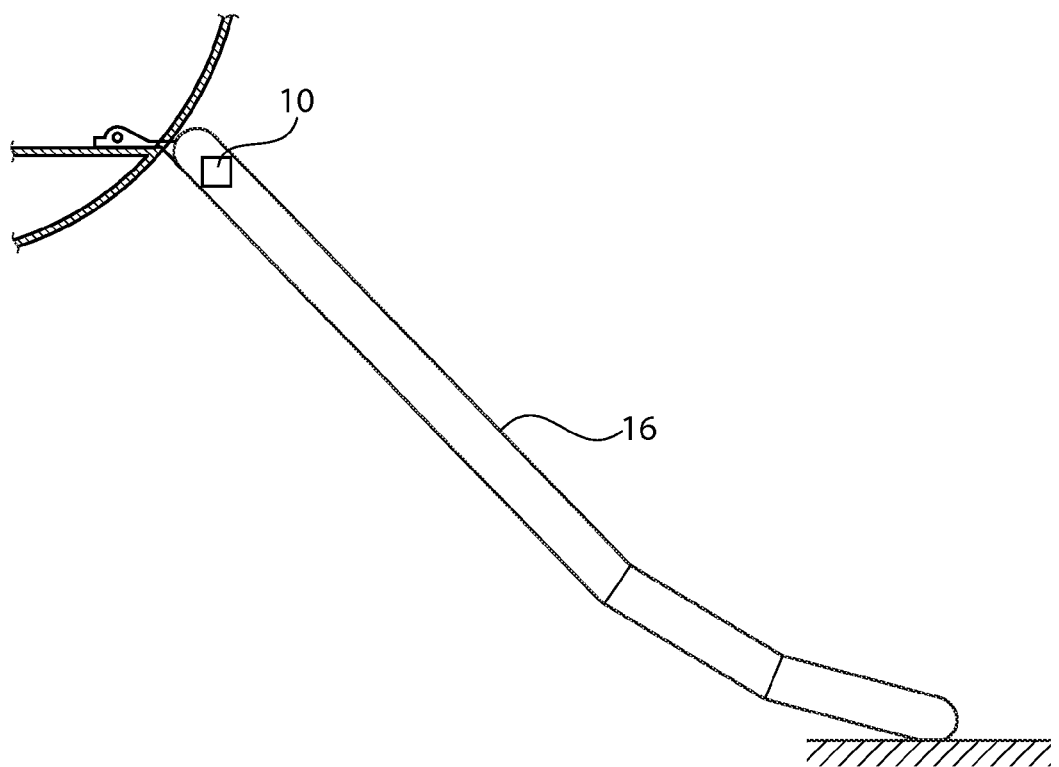
FIG. 9 shows one example of an inflation system used in connection with an evacuation slide for an aircraft.

In use, electrical current will be transmitted from the power source via an electrical switching component 56 to power the motor. The electric motor 28 will run the compressor wheel 18 until a specified pressure is reached and then switch off. At that time, a one-way valve can be closed to maintain pressure in the inflatable structure. The one-way valve may be provided as a flapper valve 44. In one example, the flapper valve 44 can be adjusted via a flapper handle 46. FIGS. 8A and 8B illustrate a flapper valve in the open and closed positions. If the valve 44 is not present or does not close or if there is otherwise a failure to maintain pressure in the inflatable structure, the electric motor 28 will continue to run and maintain pressure in the inflatable structure as long as needed.

For example, a battery-powered motor used on an evacuation slide could maintain the desired inflation pressure of the evacuation slide for an entire evacuation duration. This can allow for a reduction in requirements for the air holding fabric. This can help eliminate the need for a sealing flapper assembly and associated issues therewith. It is possible for a battery-powered electric motor to store extra energy to top off a leaking unit. This could keep a punctured unit operational. An electric or battery powered system can be cycled on and off if need be. For example, the system may cycle on and off depending upon the pressure sensed by an optional pressure sensor. For example, the system 10 may be provided with a pressure transducer to monitor inflatable pressure. In one example, the system may be caused to inflate the inflatable unit 16 to about 1.5 psig and then turn off the compressor. The compressor may then be turned back on compressor on when the inflatable's pressure drops to 1.0 psig or below. There may also be provided a manual override switch.

The compressor wheel 18, battery 50, and electric motor 28 may be selected to cooperate with one another in order to deliver optimal and desired inflation characteristics. For example, the size of the compressor wheel 18 and the size of the inflation structure 16 may dictate the size of the electric motor 28 and battery 50 required for use. Upon triggering of the activation system 48, the electric motor 28 is caused to activate in order to start movement of the compressor wheel 18 of the mixed flow compressor 12. Movement of the compressor wheel 18 generates a rotational force that creates vacuum to pull ambient air "A" through the air inlet 22, diagonally across the blades 20, out the exit 24, and into the inflatable structure 16. The activation system 48 may be triggered by any number of inputs or triggering events. For example, if used in connection with an aircraft life raft or evacuation slide, the activation system may be triggered automatically by dropping of the evacuation slide. In a further example, the triggering event could be the opening of an exit door. In another example, the activation system may be triggered by a secondary manual trigger. In other example, the triggering event could be activation of a pull cord which flips a switch or pulls a pin which allows electrical contact. In another example, the triggering event could be activation by remote control. In a further example, the triggering event could be water contact or a water activated trigger activated by a water contact/presence sensor. In another example, the triggering event could be the orientation or movement of the system 10. Combinations of any of these triggering events are also possible and considered within the scope of this disclosure.

One specific embodiment of a mixed flow compressor 12 includes an air inlet 22, a compressor wheel housing 42, a compressor wheel 18, an outlet 24 in fluid communication with the inflatable structure, a DC brushless motor 28 to rotate the compressor wheel 18 at a high RPM, a DC battery, a switching device 56 to apply power from the battery 50 to the motor 28, and a charging device to maintain the readiness of the battery that has a visible charge indicator.

Benefits of using an electric or battery-powered motor are that there is no need to house or store any type of gas. Unlike a compressed gas system, there are no primary leak paths while the mixed flow compressor inflation system is waiting to be deployed. It is expected that an electric system will deliver a similar performance regardless of temperature, unlike the use of compressed gas. (A typical compressed gas inflation system provides lower pressure in cold conditions. Units inflated with hot gases from gas generators can lose pressure as the hot gas cools.) An electric or battery-powered motor is also less dangerous than compressed gas and gas generator inflation systems.

It is also believed that providing a battery-powered mixed flow compressor can help reduce cost to manufacture inflation systems by about 50-70%, can help reduce their size by about 50-70%, can help reduce their weight by more than 75%, can help improve reliability, and can help elongate required service intervals by using batteries with long lives. (For example, one exemplary battery can be about 5"×3" and weigh about 2 pounds. This is in contrast to stored gas cylinders which are generally about 10"×30" and weigh about 43 pounds.) There are no special Department of Transportation (DOT) regulations that need to be addressed by use of batteries or related electronics. The battery life could be maintained for multiple years from the aircraft charging system or aircraft auxiliary power unit (APU). An electric powered compressor can be operated multiple times when powered by electricity or battery.

In use, a single mixed flow compressor 12 may be mounted to either a first tube/chamber or a second tube/chamber of an inflatable structure. It is possible for more tubes/chambers to be provided. The plurality of tubes/chambers may be in fluid communication by a hose that allows gas to flow therebetween. In other examples, a separate mixed flow compressor 12 may be mounted in/on each inflatable tube/chamber of an inflatable structure. This could result with multiple units used for inflating a single inflatable structure. Multiple units may have the same or different flow characteristics in order to achieve a desired deployment. Mounting mixed flow compressors in series may help increase unit pressure and can help speed up inflation time. During inflation, the mixed flow compressors could be run concurrently or in stages with individual one-way valves.

It is desirable to prevent the mixed flow compressor 12 from ingesting water during inflation. In one example, there may be provided a switching mechanism that only allows the mixed flow compressor to operate if it is right side up. In another example, the battery and electrical parts may be sealed in a waterproof housing in order to allow the system to operate in a marine or otherwise water-prone environment. Other water-prevention options are possible. For example, the activation system 48 can be configured to begin inflation of the inflatable structure before it enters water. In another example, it is possible to inflate a secondary chamber of the inflation structure using a small compressed gas cylinder in order to lift the location at which the mixed flow compressor 12 is positioned out of the water. In another example, it is possible to locate the mixed flow compressor 12 on the top of the inflation structure. It is possible to provide flotation material around the mixed flow compressor 12 in order to lift it out of the water. In other examples, the packed unit center of gravity may be positioned such that it flips the inflatable right side up upon inflation. It is also possible to use an inflation canopy to lift the mixed flow compressor 12 out of the water. Another embodiment may provide a snorkel tube that automatically extends above the mixed flow compressor and out of the water. There may be provided a switching mechanism that only allows the mixed flow compressor 12 to operate if it is right side up. It is also possible to add a water-activated switching mechanism that turns off the mixed flow compressor 12 if it is underwater. It is also possible to provide a device at the air inlet 22 that closes the intake inlet area when the mixed flow compressor is submerged to prevent ingestion of water into the unit.

Changes and modifications, additions and deletions may be made to the structures and methods recited above and shown in the drawings without departing from the scope or spirit of the disclosure or the following claims.

What is claimed is:

1. An electrically powered inflation system for inflating an inflatable structure on-board a passenger transportation vehicle, the inflation system comprising:

a mixed flow compressor comprising a compressor wheel mounted with respect to a motor mount and a compressor housing, the compressor housing comprising an air intake inlet having an inlet axis, the compressor wheel comprising a cone-shaped backplate that supports curved blades, the curved blades comprising a length extending along the cone-shaped backplate defining a curve and a height extending up from the backplate, each of the curved blades comprising an inlet region, an outlet region, and a twisted portion along the curved blade height between the inlet region and the outlet region such that the inlet region comprises an angle different from the outlet region, an electric motor configured to impart rotational speed to the compressor wheel, wherein the electric motor is battery-powered, wherein the compressor housing further comprises an exit in fluid communication with the inflatable structure, wherein in use, ambient air enters the intake inlet along the inlet axis and exits the compressor wheel curved blades at a diagonal angle with respect to the inlet axis.

2. The inflation system of claim 1, wherein the inflation system functions without using a pressurized gas reservoir.

3. The inflation system of claim 1, wherein the electric motor is a brushless DC motor.

4. The inflation system of claim 1, wherein the electric motor that is battery-powered uses a battery that is rechargeable.

5. The inflation system of claim 1, wherein the electric motor that is battery-powered uses a battery that comprises a lithium battery.

6. The inflation system of claim 1, wherein the inflation system comprises a charge indicator.

7. The inflation system of claim 1, wherein the inflation system delivers a high flow rate for a life raft or an inflatable shelter of about 10 to about 320 cubic feet per minute.

8. The inflation system of claim 1, wherein the inflation system delivers a high flow rate for an evacuation slide of about 340 to about 2250 cubic feet per minute.

9. The inflation system of claim 1, wherein the inflation systems delivers a high pressure for inflating a life raft or an evacuation slide of about 1-4 psig.

10. The inflation system of claim 1, installed on a life vest, inflatable shelter, life raft, or an evacuation slide of an aircraft.

11. The inflation system of claim 1, wherein the compressor wheel is moveable in the compressor housing in order to alter an air gap size between compressor blades and the compressor housing.

12. The inflation system of claim 11, further comprising a drive shaft of the motor and wherein the compressor wheel is configured to slide with respect to the drive shaft.

13. The inflation system of claim 1, further comprising a drive shaft and wherein the drive shaft moves within the housing or wherein the motor and compressor wheel move with respect to the housing.

14. The inflation system of claim 1, wherein the inflation system comprises a protection system to protect the inflation system when exposed to liquid.

15. The inflation system of claim 14, wherein the protection system comprises the inflation system being at least partially sealed in a water resistant housing to allow the system to operate while at least partially exposed to or submerged in liquid.

16. The inflation system of claim 14, wherein the protection system comprises a device to prevent ingestion of water when the inflation system is exposed to or submerged in liquid.

17. The inflation system of claim 1, further comprising a controller that will run the electric motor to a specified pressure, then switch the electric motor off.

18. The inflation system of claim 17, further comprising a one-way valve that closes to maintain the specified pressure.

19. The inflation system of claim 1, wherein electrical current is transmitted from a battery via an electrical switching component to power the electric motor.

20. The inflation system of claim 1, further comprising a battery charger that charges a battery from a power generator of the vehicle.

21. The inflation system of claim 1, further comprising a plurality of inflation systems mounted on a single inflatable structure.

22. The inflation system of claim 1, wherein the inlet region of the curved blades comprise features of axial blades and wherein the outlet region of the curved blades comprise features of radial blades.

23. The inflation system of claim 1, wherein the compressor wheel comprises a concave cone or volcano-shaped backplate that supports the curved blades.

24. The inflation system of claim 1, wherein the inflation system delivers a high pressure for inflating a life raft or an evacuation slide of about 1.5-2 psig.

25. A method for inflating an inflatable structure, comprising:
    providing the electrically-powered inflation system with a mixed flow compressor of claim 1;
    using the mixed flow compressor to convert ambient air into a high pressure air flow; and
    transmitting the high pressure air flow into the inflatable structure, causing the inflatable structure to inflate.

26. The method of claim 25, wherein the inflatable structure is inflated with sufficient pressure to make the inflatable structure rigid or semi-rigid.

27. The method of claim 25, wherein the inflatable structure comprises an evacuation slide, a life raft, a shelter, or a pneumatic structure.

28. A method for inflating a life raft or an evacuation slide, comprising:
    (a) providing a battery-powered inflator system comprising
        a compressor wheel mounted with respect to a motor mount and a compressor housing, the compressor wheel comprising a cone-shaped backplate that supports curved blades, the curved blades comprising a length extending along the cone-shaped backplate defining a curve and a height extending up from the backplate, each of the curved blades comprising an inlet region, an outlet region, and a twisted portion along the curved blade height between the inlet region and the outlet region such that the inlet region comprises an angle different from the outlet region, causing air to exit the compressor wheel blades at a diagonal angle with respect to an incoming axis of the air;
        an electric motor configured to impart rotational speed to the compressor wheel, wherein the electric motor is battery-powered, and
        an activation system activated by a triggering event;
    (b) the activation system causing inflation upon the triggering event by delivering battery power to the motor, causing the compressor wheel to rotate, and delivering air generated by the compressor wheel to the life raft or evacuation slide.

* * * * *